United States Patent
Sager et al.

(10) Patent No.: US 11,080,719 B2
(45) Date of Patent: Aug. 3, 2021

(54) METHODS AND SYSTEMS FOR MAKING, TRACKING AND AUTHENTICATION OF PRODUCTS

(71) Applicant: Philip Morris USA Inc., Richmond, VA (US)

(72) Inventors: Alain Sager, Bossonnens (CH); Philippe Chatelain, Chavornay (CH); Erwan Fradet, Lausanne (CH)

(73) Assignee: Philip Morris USA Inc., Richmond, VA (US)

( * ) Notice: Subject to any disclaimer, the term of this patent is extended or adjusted under 35 U.S.C. 154(b) by 1031 days.

(21) Appl. No.: 14/144,829

(22) Filed: Dec. 31, 2013

(65) Prior Publication Data

US 2014/0122353 A1 May 1, 2014
US 2017/0345018 A9 Nov. 30, 2017

Related U.S. Application Data

(60) Division of application No. 12/839,166, filed on Jul. 19, 2010, now Pat. No. 8,671,062, which is a (Continued)

(30) Foreign Application Priority Data

Oct. 8, 2004 (EP) .................................. 04104954

(51) Int. Cl.
  *G06K 17/00* (2006.01)
  *G06Q 30/00* (2012.01)
  *G06Q 30/02* (2012.01)

(52) U.S. Cl.
  CPC ......... *G06Q 30/0185* (2013.01); *G06K 17/00* (2013.01); *G06K 17/0022* (2013.01); *G06Q 30/0282* (2013.01)

(58) Field of Classification Search
  None
  See application file for complete search history.

(56) References Cited

U.S. PATENT DOCUMENTS 4,035,615 A   7/1977   Best et al.
4,094,244 A   6/1978   Edwards et al.
            (Continued)

FOREIGN PATENT DOCUMENTS

BG   61241 B1   3/1997
BG   63518 B1   3/2002
            (Continued)

OTHER PUBLICATIONS

Jeleve, Presentation 1 "Technology for protection by multimedia multistage encrypted marks of documents, securities and goods against counterfeit", Jul. 28, 2009. (37 pages).

(Continued)

*Primary Examiner* — John W Hayes
*Assistant Examiner* — Zehra Raza
(74) *Attorney, Agent, or Firm* — Harness, Dickey & Pierce, P.L.C.

(57) ABSTRACT

Manufactured goods are marked or labelled with a secure unique identifier. A central checking centre allows users to verify the authenticity of a particular good such as a cigarette pack or carton via any convenient interface such as the internet or a cell phone. A system of secret sharing allows secure authentication of each item and prevents code breaking or misuse.

18 Claims, 3 Drawing Sheets

Related U.S. Application Data continuation of application No. 11/664,841, filed as application No. PCT/IB2005/003103 on Sep. 29, 2005, now abandoned.

(56) References Cited

U.S. PATENT DOCUMENTS

| | | | |
|---|---|---|---|
| 4,354,101 A | 10/1982 | Hester et al. | |
| 4,463,250 A | 7/1984 | McNeight et al. | |
| 4,529,871 A | 7/1985 | Davidson | |
| 4,860,226 A | 8/1989 | Martin et al. | |
| 4,963,719 A | 10/1990 | Brooks et al. | |
| 5,382,779 A | 1/1995 | Gupta | |
| 5,467,433 A | 11/1995 | Lamprecht, Jr. et al. | |
| 5,621,864 A | 4/1997 | Benade et al. | |
| 5,767,498 A | 6/1998 | Heske, III et al. | |
| 5,805,779 A | 9/1998 | Christopher et al. | |
| 5,837,983 A | 11/1998 | Actis et al. | |
| 5,850,080 A | 12/1998 | Herzig | |
| 5,892,900 A | 4/1999 | Ginter et al. | |
| 5,930,215 A | 7/1999 | Fite et al. | |
| 6,069,955 A | 5/2000 | Coppersmith et al. | |
| 6,122,403 A | 9/2000 | Rhoads | |
| 6,134,561 A | 10/2000 | Brandien et al. | |
| 6,212,638 B1 | 4/2001 | Lee et al. | |
| 6,217,966 B1 | 4/2001 | Finster et al. | |
| 6,226,619 B1 | 5/2001 | Halperin et al. | |
| 6,260,029 B1 | 7/2001 | Critelli | |
| 6,272,634 B1 | 8/2001 | Tewfik et al. | |
| 6,442,276 B1 * | 8/2002 | Doljack | G06K 17/00 380/51 |
| 6,712,275 B1 | 3/2004 | Borg | |
| 6,892,947 B1 | 5/2005 | Jam et al. | |
| 6,963,846 B1 | 11/2005 | Kelly et al. | |
| 6,996,543 B1 | 2/2006 | Coppersmith et al. | |
| 7,028,901 B2 | 4/2006 | Carlson | |
| 7,188,258 B1 | 3/2007 | Aggarwal et al. | |
| 7,246,748 B1 | 7/2007 | Feuerman et al. | |
| 7,283,630 B1 | 10/2007 | Doljack | |
| 7,497,379 B2 | 3/2009 | Chen et al. | |
| 7,991,995 B2 * | 8/2011 | Rabin | G06F 21/10 705/51 |
| 2001/0011276 A1 * | 8/2001 | Durst, Jr. | G06F 17/30725 |
| 2002/0053796 A1 | 5/2002 | McCann et al. | |
| 2002/0091593 A1 | 7/2002 | Fowler | |
| 2002/0158133 A1 | 10/2002 | Conzola et al. | |
| 2002/0158137 A1 | 10/2002 | Grey et al. | |
| 2003/0042312 A1 | 3/2003 | Cato | |
| 2003/0051767 A1 | 3/2003 | Coccaro et al. | |
| 2003/0074223 A1 | 4/2003 | Hickle et al. | |
| 2003/0126034 A1 | 7/2003 | Cheney et al. | |
| 2003/0179902 A1 | 9/2003 | Ambrogio et al. | |
| 2004/0024790 A1 | 2/2004 | Everett | |
| 2004/0084530 A1 | 5/2004 | McQueen et al. | |
| 2004/0117265 A1 | 6/2004 | Hoffman | |
| 2004/0172260 A1 | 9/2004 | Junger et al. | |
| 2005/0075900 A1 | 4/2005 | Arguimbau, III | |
| 2005/0108044 A1 | 5/2005 | Koster | |
| 2005/0234823 A1 | 10/2005 | Schimpf | |
| 2005/0246237 A1 | 11/2005 | Hudetz et al. | |
| 2005/0288938 A1 | 12/2005 | Date et al. | |
| 2006/0011726 A1 | 1/2006 | Chen et al. | |

FOREIGN PATENT DOCUMENTS

| | | |
|---|---|---|
| DE | 101 00 248 A1 | 7/2002 |
| EP | 1 046 276 A1 | 10/2000 |
| EP | 1 719 070 B1 | 4/2009 |
| FR | 2900486 A1 | 11/2007 |
| JP | 2003-134101 A | 5/2003 |
| JP | 2004-94510 A | 3/2004 |
| JP | 2005-216316 A | 8/2005 |
| JP | 2006-229881 A | 8/2006 |
| WO | 99/04364 A1 | 1/1999 |
| WO | 00/24187 A1 | 4/2000 |

OTHER PUBLICATIONS

Jeleve, Presentation 2 "Technology for protection by multimedia multistage encrypted marks of documents, securities and goods against counterfeit", Jul. 28, 2009. (29 pages).

Search Report dated Mar. 15, 2005 in European Application No. 04104954.

Office Action dated Oct. 11, 2011 in Japanese Application No. 2007-535270.

Office Action dated Sep. 24, 2012 in Japanese Application No. 2007-535270.

Office Action dated Dec. 18, 2013 in Japanese Application No. 2007-535270.

Appeal Decision issued Apr. 14, 2014 in Japanese Application No. 2007-535270.

Office Action dated Oct. 31, 2011 in Korean Application No. 10-2007-7009864.

Notice of Allowance dated Feb. 15, 2012 in Korean Application No. 10-2007-7009864.

Communication pursuant to article 96(2) EPC dated Nov. 16, 2006 in European Application No. 05792643.

International Preliminary Report on Patentability dated Apr. 11, 2007 in International Application No. PCT/IB2005/003103.

Communication pursuant to article 96(2) EPC dated May 29, 2007 in European Application No. 05792643.

Communication pursuant to article 96(2) EPC dated May 27, 2008 in European Application No. 05792643.

Notice of Opposition issued Jul. 28, 2009 in European Application No. 05792643.

Notice of Opposition issued Jan. 29, 2010 in European Application No. 05792643.

Reply of the patent proprietor to the notice of opposition filed Sep. 1, 2010 in European Application No. 05792643.

Communication dated May 24, 2012 in European Application No. 05792643.

Summons to attend oral proceedings issued Dec. 4, 2012 in European Application No. 05792643.

Response to the summons of Dec. 4, 2012 filed May 2, 2013 in European Application No. 05792643.

F. Piper & S. Murphy, "Cryptography—A Very Short Introduction", Oxford University Press, Oxford & New York 2002.

A. Menezes, P. van Oorschot and S. Vanstone, "Handbook of Applied Cryptography", CRC Press, Boca Raton, London & New York 1997.

H. X. Mel & D. Baker, "Cryptography Decrypted", Addison-Wesley, Boston et al. 2001.

C.H. Meyer et al., "Cryptography—A new dimension in computer data security", John Wiley & Sons, New York et al. 1982.

W. Mao, "Modern Cryptography—Theory & Practice", Prentice Hall and Hewlett Packard Books 2004.

C.H. Meyer et al., "Some Cryptographic Principles of Authentication in Electronic Funds Transfer Systems", SIGCOMM '81 Proceedings of the seventh symposium on Data communications, pp. 73-88, 1981.

Webster's new collegiate dictionary, G. & C. Merriam Co., 1981.

Decision revoking the European Patent issued Jul. 24, 2013 in in European Application No. 05792643.

Statement of grounds of Appeal issued Nov. 27, 2013 in in European Application No. 05792643.

Merriam-Webster Printout "Authentication" from <http://www.merriam-webster.com/dictionary/store>authentication, Nov. 18, 2013.

Wikipedia Printout "authentication", http://en.wikipedia.org/wiki/Authentication, Nov. 18, 2013.

Excerpt from "Applied Cryptography, Second Edition: protocols, algorithms, and source code in C" John Wiley & Sons, Inc., printed in 1996.

Merriam-Webster printout "during" from http://www.merriam-webster.com/dictionary/during, Nov. 18, 2013.

Product description of "Cryptography Decrypted" from WWW.Amazon.Co.uk, from <http://www.amazon.co.kr/cryptography-Decrypted-H-X-Mel/dp/02>, Oct. 30, 2013.

(56) References Cited

OTHER PUBLICATIONS

Merriam-Webster printout "store" from <http://www.merriam-webster.com/dictionary/store>, Nov. 18, 2013.
Reply to Appeal filed Apr. 2, 2014 in in European Application No. 05792643.
Communication regarding Oral Proceedings issued Jul. 22, 2019 in European Application No. 05792643.
Communication regarding Minutes of Oral Proceedings issued Oct. 23, 2019 in European Application No. 05792643.
Decision issued Mar. 6, 2020 in European Application No. 05792643.
Non-Final Office Action dated Aug. 5, 2009 in U.S. Appl. No. 11/664,841.
Final Office Action dated Mar. 17, 2010 in U.S. Appl. No. 11/664,841.
Non-Final Office Action dated Jan. 15, 2013 in U.S. Appl. No. 12/839,166.
Final Office Action dated May 20, 2013 in U.S. Appl. No. 12/839,166.
Notice of Allowance dated Oct. 17, 2013 in U.S. Appl. No. 12/839,166.
First Office Action dated Jul. 3, 2009 in Chinese Application No. 200580034308.
Second Office Action dated Dec. 2, 2010 in Chinese Application No. 200580034308.
Third Office Action dated Dec. 9, 2011 in Chinese Application No. 200580034308.
International Search dated Jan. 23, 2006 in International Application No. PCT/IB2005/003103.
Written Opinion dated Jan. 23, 2006 in International Application No. PCT/IB2005/003103.
Non-Final Office Action dated Jul. 15, 2020 in U.S. Appl. No. 15/606,343.
Final Office Action dated Jan. 7, 2021 in U.S. Appl. No. 15/606,343.
Office Action dated May 20, 2010 in Mexican Application No. MX/A/2007/004024.
Office Action dated Jul. 3, 2012 in Canadian Application No. 2,581,358.
Office Action dated May 9, 2017 in Brazilian Application No. PI0516532-6.
Examination Report and Notice of Acceptance of complete Specification dated Aug. 16, 2010 in New Zealand Application No. 553844.
Datasheet for the Decision dated Oct. 15, 2019 for Boards of Appeal of the European Patent Office in European Application No. 05792643.8.
Internet full extract-Commercial register of canton Zurich, retrieved on May 6, 2013 from internet «http://zh.powernet.ch/webservices/inet/HRG/HRG.asmx/getHRGHTML?chnr+02060..».
Examiner's First Report and Search Information Statement dated Feb. 24, 2010 in Australian Application No. 2005290920.
Notice of Acceptance dated Dec. 7, 2010 in Australian Application No. 2005290920.

* cited by examiner

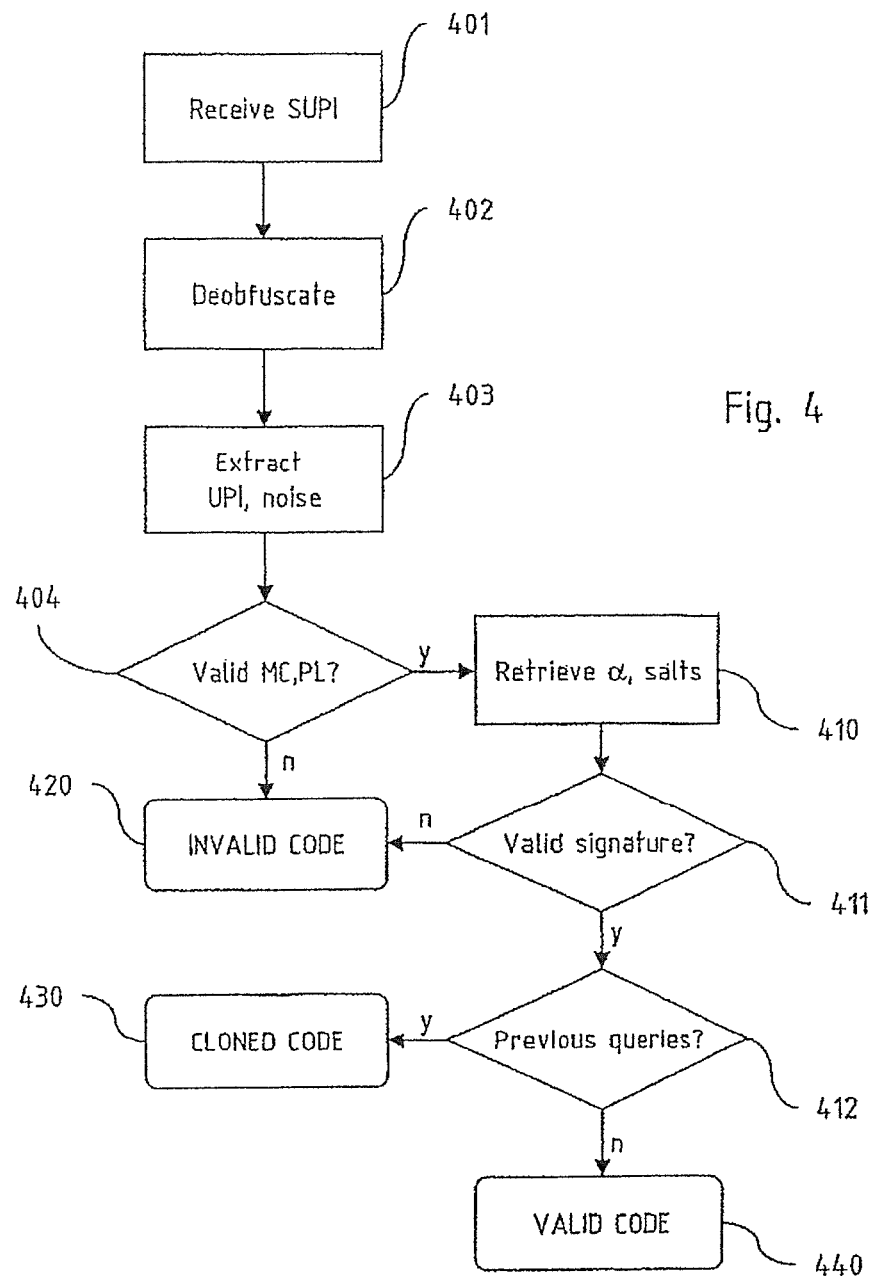

METHODS AND SYSTEMS FOR MAKING, TRACKING AND AUTHENTICATION OF PRODUCTS

RELATED APPLICATION

This application is a divisional under 35 U.S.C. § 121 of U.S. application Ser. No. 12/839,166 filed on Jul. 19, 2010, which is a continuation of U.S. application Ser. No. 11/664,841 filed on Apr. 6, 2007, which is a national application of PCT/IB2005/003103 filed on Sep. 29, 2005, designating the U.S., and which claims priority to European application EP04104954.5 filed on Oct. 8, 2004. The entire content of each prior application is hereby incorporated by reference in its entirety.

FIELD OF THE INVENTION

This invention relates to the marking, tracking and authentication of goods, in particular, but not exclusively, of packaged goods, for example packs or cartons of cigarettes and other tobacco products. The invention also relates to production control.

BACKGROUND TO THE INVENTION

Contraband and counterfeiting cause significant loss of revenue to producers of traded goods as well as for national authorities. Moreover, the illegal sale of counterfeited goods of inferior quality is detrimental to the customer and to the manufacturer.

Legally produced goods may also be illegally imported or traded, for example in order to evade taxes or national regulations. It is therefore a major concern in several trade areas to detect and avoid unauthorized parallel import channels.

The problems of contraband and counterfeiting are particularly acute for goods subject to special taxation, like tobacco products. They also exist for many other kinds of traded products carrying a strong brand value, in particular for internationally traded products, such as perfumes, alcohols, watches and luxury goods in general.

It is a major concern of the manufacturers of such products to develop methods for reliably marking genuine products such as to enable the unequivocal identification of non-genuine products and the detection of illegal imports.

It is common practice to identify traded goods by a production code, or serial number, impressed or printed on the package, for example a cigarette pack or carton.

Such a code, under certain conditions, enables identification of the production site, and the tracking of the trade chain for a particular item. Such knowledge is useful in identifying smuggled items.

A limitation of this practice is that the interpretation and validation of these production codes can be time-consuming and cumbersome. For example, authentication may require every production code impressed on a manufactured item to be recorded in a database and/or the transfer of a large amount of confidential data from the manufacturing site to a central database. These requirements may jeopardize reliability and safety.

Another limitation of this practice is that the production codes can easily be imitated or cloned. To partially obviate this limitation, it is known to add a covert taggant to the ink used to print the production code on the package. Counterfeit items carrying clones of valid codes can be thus detected by the absence of the covert taggant. The security provided by this method depends entirely on the ability to control the sources and the availability of the taggant.

The present invention aims to address the deficiencies in the prior art approaches described above.

According to the invention, there is provided a method of marking manufactured items, comprising: providing a plurality of secret codes to a checking centre and to a production line for the manufactured items; generating an ID code for each manufactured item; digitally signing each ID code by means of a secret derived from the plurality of secret codes and known to the checking centre; and marking each manufactured item with said signed ID code.

The present invention also provides a method of authenticating an item marked according to the method above comprising transmitting the said signed ID code to said checking centre; and authenticating the ID code at the checking centre.

The invention also provides a system for marking manufactured items comprising: a generator, for generating collections of secret codes; a production line for manufacturing the items to be marked, the production line comprising: a code generator for generating an ID code for each manufactured item; a digital signor for signing the ID codes with a secret derived from the secret codes; a data transmitter for transmitting the secret to a checking centre; and a marker for marking each manufactured item with the signed ID code.

The invention also provides a method of authenticating a manufactured item, comprising: generating a code and signing said code with a digital signature within a code generator; marking the item with the signed code; transmitting the signed code to a checking centre over a public network; authenticating the digital signature by the checking centre; retrieving the significance of the code at the checking centre; and transmitting the significance to a user over the public network.

A further aspect of the invention resides in a method of controlling the volume of manufactured items marked by the marking method above, comprising: gathering manufacturing volume information at the checking centre; and providing the manufacturing volume information to a user.

The invention also provides a method of tracking an item marked by to the marking method above, comprising: transmitting the signed ID code to the checking centre; authenticating the ID code by the checking centre; and retransmitting the tracking information related to the ID code to a user.

Embodiments of the various aspects of the invention have the advantage that marking and authentication can be accessed and interrogated remotely by an ordinary network, such as a land or mobile telephone. The marking and authentication has the further advantage that it may not be violated by counterfeiters. Moreover, the genuineness of a manufactured item on sale can be checked easily, for example within a few seconds at the point of sale.

Embodiments of aspects of the invention have the further advantage that cloned codes and unauthorized code duplications may be identified, and that the production volume, for example of a given manufacturer, manufacturing site or manufacturing line, may be controlled.

Embodiments of aspects of the invention have the further advantage that they may be used to replace the system of fiscal stickers that is used in many countries to collect taxes, for example on tobacco products.

BRIEF DESCRIPTION OF THE DRAWINGS

Embodiments of the invention will now be described, by way of example only, and with reference to the accompanying drawings in which:

FIG. 4 is a flow chart showing a code authentication scheme embodying the invention.

DETAILED DESCRIPTION OF THE INVENTION

Figure 1:
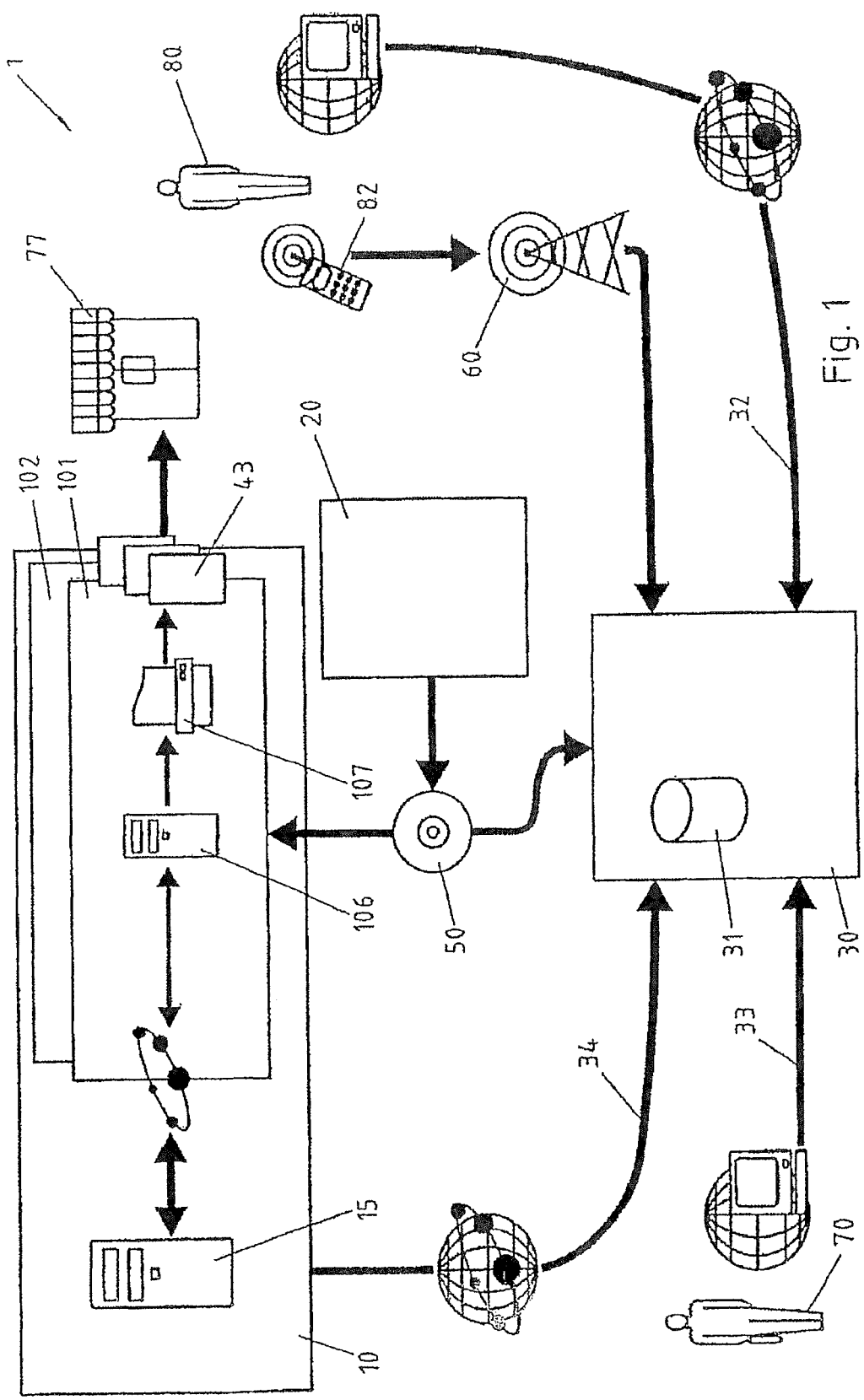
FIG. 1 is a schematic view of a marking and authentication system embodying the invention.

Referring to FIG. 1, the items to be marked are produced on one or more production lines 101, 102. Each production line represents a production facility for one or more manufactured items. For example, a production line may be a cigarette making and packaging line, with the manufactured items being, for example, cigarette packs and cartons of at least one brand. The production may be organized in batches, each batch being dedicated to the production of a certain amount of identical manufactured items, for example cigarette packs and cartons of a particular brand and type.

If there are two or more production lines, these lines may be physically located at one manufacturing site 10, or at different production centres 10 having various geographical locations.

Each production line comprises a code generator 106 arranged to generate and encrypt an identification code for each item manufactured on the production line 101. The production line 101 also comprises a marker 107. Any suitable marking means may be used such as a continuous inkjet printer, a drop-on-demand inkjet printer, a laser printer, or any other printer or marker that allows the marking of variable information, to impress or print the identification code on each manufactured item. Depending on the nature of the packaging, the identification codes can be impressed on each item, on an external package, on labels or in any other convenient way. In one embodiment, the identification code is printed on adhesive tags, or labels, to be applied to the manufactured items, preferably non-removably.

In one embodiment the identification code is printed by a laser beam on a layer of laser-sensitive material deposited on the item or on the item's package. This method allows the code to be impressed through a transparent wrapping layer.

Other possible supports for the identification code include holographic printing, for example using the HoloSpot® format.

Embodiments of the invention may also include radio, electronic or magnetic recording of the identification code, for example using an RFID transponder, EMID® tags or any other tagging means.

Preferably the system has means to count and report the number of codes generated and printed codes in each production batch or in a given production period, as will now be described in detail. The production lines 101 include a code generation system 106 which generates a unique encrypted identification code SUPI for each item produced. Preferably, the code generation system 106 is a fully autonomous computer or microcontroller dedicated to a particular production line 101. Preferably the code generation system 106 can communicate with a checking centre 30 via a secure internet connection 34, a local central server 15, or any other suitable data communication means.

The checking centre 30 receives and centralizes production data and processes queries from users 80, 70.

In one embodiment of the invention, several levels of packaging, such as packs and cartons comprising several packs, which are manufactured on the same manufacturing line 101, may be marked using common hardware resources.

In one embodiment the code generation system 106 may comprise different or shared software modules, loaded on a computer common to several production lines, and serve several production lines at the same time. The code generation system 106 may be remotely located, for example in the checking centre, and communicate the generated codes to the production lines, as required, by appropriate network means. The code generation system performs a number of functions, as described below, including the generation of ID codes for the items and the signing of those ID codes.

Figure 2:
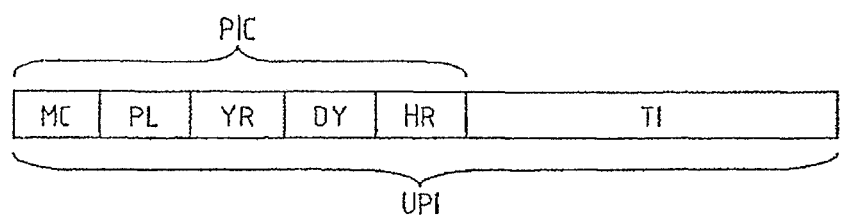
FIG. 2 shows schematically a marking code format embodying the invention.

In the embodiment of FIG. 2, the unique identification code SUPI is obtained by processing data in a Production Information Code PIC. The PIC combines various data related to the manufacture of the item, such as a code MC identifying a manufacturing centre 10, a code PL identifying a particular production line 101 within a manufacturing centre 10, and codes YR, DY, HR identifying the year, day and hour, respectively, when a particular item was manufactured. In one alternative embodiment, the PIC may include a code generator ID instead of the manufacturing centre and production line codes MC, PL.

To obtain the PIC, the individual data elements can be combined by decimal or binary digit juxtaposition, by algebraic composition, by applying a predefined shift value each data element and adding all the shifted values together, or by any other computational means. Preferably the composition function is invertible, to allow decomposition of the PIC into the original elements MC, PL, YR, DY, HR. In the case of a non-reversible composition function, an additional element may be introduced into the PIC to ensure uniqueness.

During each production hour, a production line fabricates a large number of items 43. Each item 43 is identified, within a production hour, by an individual number TI, for example a progressive number corresponding to the chronological production sequence. Other manners of generating or assigning individual numbers are possible.

The production information code PIC and the individual number TI are combined to provide an item identifier UPI. In the following description, each UPI is unique to an item, for example to a single cigarette pack or cigarette carton. However the invention is not limited to this case, and includes variants with non-unique UPI numbers, distinguishable from each other by their different digital signatures.

The structure of the UPI code and the significance of the various fields composing the UPI code are exemplary and are not limiting. Any code suitable as item identifier code, having any arbitrary structure and significance, may be employed in the frame of the present invention.

A pseudorandom noise value code is combined with the UPI to authenticate the code generator 106 that produces the code. The noise value acts as a digital signature for the code marked on each manufactured item produced by a particular manufacturing line 101 applied by the code generator 106 which can be verified by the checking centre 30. To ensure verifiability by the checking centre, the pseudorandom noise code may obtained by encrypting a copy of the UPI code with a secret shared by the code generator and the checking centre. 'Secret' designates any data used for generation or authentication of a digital signature. Other ways of adding a digital signature to the UPI code are possible, for example by using asymmetric cryptography, and are included within the scope of the invention. The secret is derived from secret codes, which may be regarded as static secret codes.

In one embodiment of FIG. 1, a centralized salt generator centre 20 generates a large collection of secret codes, hereinafter designated as a 'salt matrix' containing a large number of precalculated random or pseudorandom data. Each salt matrix is preferably unique and is transmitted, in duplicate, to the intended manufacturing line 101 and to the checking centre 30. Each manufacturing line 101 receives a unique salt matrix. The salt matrices transmitted to the checking centre are stored in a database 31 accessible to the checking centre 30 and preferably included in the checking centre 30, with identification of the production lines 101, 102 to which they belong.

In the production lines, 101, 102, the salt matrices are used to generate secret keys used to encrypt the UPI and to generate an electronic signature, as it will be explained later.

To ensure authenticity, confidentiality and integrity of the salt matrix, the matrix is preferably not transferred over a network connection, but rather recorded on non-volatile data carriers 50 such as CD-ROMs (Compact Disc Read-Only Memory), DVD-ROMs (Digital Versatile Disc Read-Only Memory), removable hard disks, magneto-optical devices or any suitable non-volatile memory device. The data carriers are physically transferred to the checking centre 30 and to the production lines 101, 102.

Preferably, to further increase safety, the salt matrices are encrypted and digitally signed by the salt generator 20, using a suitable encryption and authentication technique, such as DES (Digital Encryption Standard), RSA (Rivest, Shamir, and Adelman algorithm), and the like. The salt matrices are not sent to the checking centre as part of the checking process for items as will be discussed.

Preferably, a salt file contains the following components:
(i) A unique salt file identifier. (ii) The salt matrix encrypted using a strong cipher, such as triple-DES, or AES (Advanced Encryption Standard), according to a key generated in the salt generator 20. A salt matrix may be, for example, a long string of random or pseudorandom digits or characters.
(iii) The encrypted key needed to decode the salt matrix, encrypted with a public-key cipher, for example RSA, using a public key of the checking centre 30. This component is requested in the salt file sent to the checking centre 30 and may be omitted in the file destined to the production line 101.
(iv) A digital signature of the salt generator, obtained for example by encoding a digest of the full message with a salt generator private key, whose public counterpart is known to the checking centre.

In this embodiment, the code generator of every production line 101 must register with the checking centre 30. This registration occurs only whenever a new salt matrix is used, or at prescribed intervals. The system does not require constant communication between the code generators and the checking centre.

The registration procedure comprises the following steps:
(i) The code generator 106 of the production line 101 connects to the checking centre 30 via a secure internet connection, or via a local central server connected to the internet, and initiates the registration by identifying itself.
(ii) A CD-ROM 50, containing a salt file, is loaded into the code generator, its integrity is verified by its electronic signature, and its unique identifier is transmitted to the checking centre 30.
(iii) The checking centre retrieves its own copy of the salt file, locally or remotely stored, by means of the unique identifier.
(iv) If the salt file has been already used, the checking centre stops the registration and requests another salt file, or initiates appropriate action, for example issuing a warning to the user or logging it in a security journal.
(v) If the salt file has not yet been used, and the identification of the code generator is satisfactory, the checking centre decrypts the secret key of the salt file with its private key, and transmits it to the code generator over the secure internet connection 34. In the case where the salt file is not unique this step takes place regardless of whether or not the salt file has already been used.
(vi) The code generator decrypts the salt matrix.

The registration procedure is arranged such that the salt matrix is never transferred over the internet. Only a one-use decryption key is transmitted from the checking centre 30 to the code generator 106. The salt matrix is made available to the code generator only after a valid registration with the checking centre. This prevents unauthorized use of the code generator as no valid code can be generated.

Figure 3:
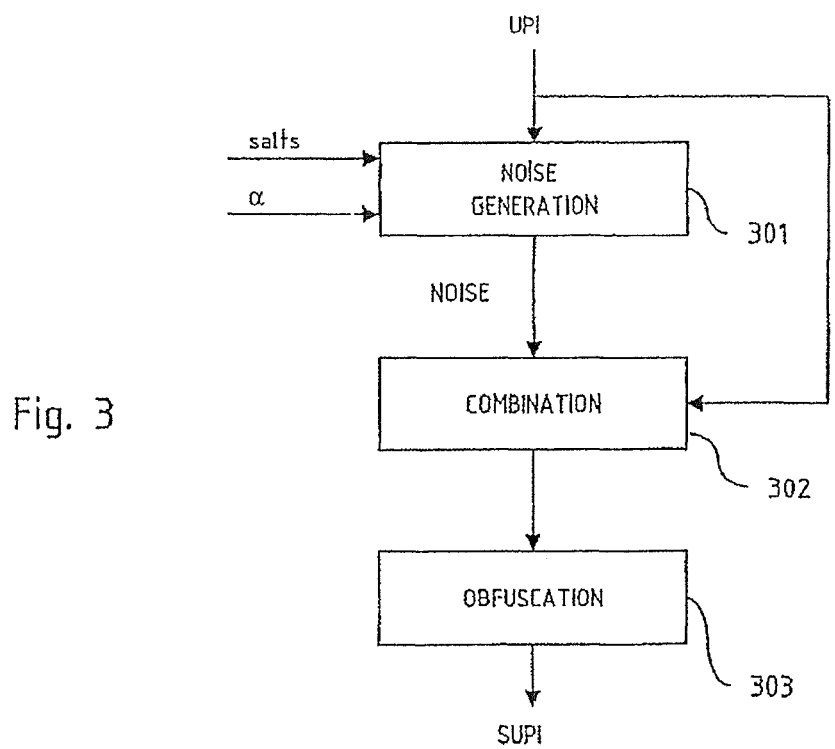
FIG. 3 is a flow chart showing a code generation scheme embodying the invention.

Preferably the decrypted salt matrix is deleted when the code generator is put out of service to prevent a malicious user from gaining access to the salt matrix without proper registration. Additional means for disabling the code generator and preventing unauthorized use of the code generator and the production line may be provided. The operation of the code generator 106 will now be described with reference to FIG. 3.

At each production line 101, 102 at the beginning of each production batch, the code generator 106 generates a random salt index alpha, which it transmits to the checking centre 30, with various information related to the item to be manufactured such as, for example, brand, intended market of destination, packaging. A new salt index alpha is generated at every change of production batch. Preferably the checking centre acknowledges successful receipt of the index alpha to the code generator. The index alpha may be regarded as a dynamic secret code.

In an embodiment the UPI code of the first item to be produced in the batch is transmitted with the index alpha to the checking centre 30. The salt index alpha is stored in database 31 related to various information about the item to be manufactured. This enables the checking centre 30, upon receipt of a request to check a particular SUPI code, to retrieve the particular alpha and knowing the salt matrix used by the code generator 106 to sign that SUPI code, validate the signature.

The salt index alpha does not need to be communicated in real time to the checking centre 30, at the beginning of each production batch. Once a value of alpha has been chosen, the code generator can immediately start to generate valid codes and the value of alpha can be communicated after a delay of some hours, or more depending on the availability of the network connection.

Backup procedures such as telephone or fax may be used to communicate the alpha to the checking centre, in case the network connection is unavailable. The random salt index alpha, the salt matrix and the UPI code are used by the code generator for generating a noise code (step 301) which is safe from cryptographic attacks. It does not allow the reconstruction of the original values of alpha, salts matrix and UPI. A variety of known techniques are available for generating the noise code including, but not limited to, table substitution, indexing, hashing, and variations thereof. The noise code so generated is unequivocally calculated from the UPI, yet the inverse operation is computationally impossible.

The noise code is used as a digital signature, allowing validation of the UPI code. Preferably the alpha code and the salt matrix are combined in a different way for each manufactured item, in order to render the digital signatures robust against decryption attempts.

The salt matrix and the alpha code are known only by the code generator and by the checking centre. Together they constitute a secret allowing the code generator to generate signed codes which the checking centre can subsequently verify.

The UPI number and the calculated noise code are combined at step 302 and, preferably, the resulting code is obfuscated at step 303, destroying correlations between successive codes. The obfuscation operation is reversible, allowing the checking centre to retrieve the original UPI and noise value. Several known obfuscation techniques are possible. The particular obfuscation algorithm chosen is preferably not published.

The result of the obfuscation, is the unique SUPI code, which is printed on the manufactured items by the printer 107. Each of the items 43 is marked with a unique digitally signed SUPI code, allowing identification of the production batch in which it has been manufactured.

Preferably, data relating to the production batch, e.g. product type, brand, intended market of destination, packaging is stored in the database 31 with the index alpha at the start of the batch. This data is accessible to the checking centre. The SUPI code can be printed on the manufactured item by a variety of printing and marking techniques, for example continuous inkjet printing, drop-on-demand printing, laser, etc. The SUPI code may be printed in a human readable format, or a machine-readable formats such as 1-D or 2-D barcodes or characters suitable for OCR (Optical Character Recognition).

Preferably the SUPI code is printed or recorded by a printing or recording means comprising a device such as a code counter or a register, for counting the exact number of marked items, either during a production batch or in a given time interval. The exact number of marked items may be stored in the database 31 accessible to the checking centre and used for production volume control. In one preferred embodiment, the SUPI code is printed with an ink containing a covert taggant, to allow a quick validity check without querying the checking centre.

The production line 101 may have a sensor to detect the presence of the SUPI (either using a vision system and/or by detecting the covert taggant, if applicable). The sensor can be connected to the controller of the production line, thus enabling the rejection of items not properly marked. The controller can be set to prevent the production line from operating if the sensor unit is disconnected, faulty or on rejection of a defined number of items. A history of rejections may be logged in the Code Generator and communicated to the Checker for monitoring purposes by authorized users. The production information code (PIC code) may be repeated on the manufactured item, in plain format without encryption or obfuscation, allowing the user to verify the answer provided by the checking centre 30 and useful for management and monitoring of the supply chain.

After leaving the production centre 10, the manufactured items 43 are distributed and commercialized in the usual way. At each stage of the distribution and commercialization process, the authenticity of the item can be verified by sending a query containing the SUPI code of the package to the checking centre. Such verification may be requested for example by generic users, such as retailers, consumers, or customs agents, and by privileged users, for example employees of the manufacturers, or organizations having a privileged agreement with the manufacturer. The SUPI codes may also be employed for tracking the manufacturing items along the distribution and commercialization chain.

FIG. 4 shows the processing of a request to validate a SUPI code in the checking centre. The received SUPI code is first de-obfuscated at step 402, by applying the inverse of the obfuscation function described above. At step 403 the original UPI and noise component are extracted. The checking centre performs a first level authentication at step 404 on the manufacturing centre MC and the production line PL. If PL is found to correspond to an existing production line of manufacturing centre MC, the authentication proceeds to the next level, otherwise a response is generated at 420 that the SUPI code is invalid, and the item is counterfeit. In the second level of authentication, the checking centre 30 uses the secret salt matrix received by the salt generator 20 and the alpha code transmitted at the beginning of a production batch. At 410 the checking centre retrieves the information related to the production batch corresponding to the received UPI code from the database 31. If the retrieval is successful, the retrieved salt matrix and the alpha code are used at 411 to reconstruct the noise code from the received UPI code and to verify the validity of the signature. If the received noise and the reconstructed noise do not match, or if no data corresponding to the PIC is present in the database, the SUPI code is identified as invalid and the checking centre responds at 420 that the item is counterfeit.

In a third level of authentication at step 412, the checking centre verifies whether queries for the same SUPI code have been submitted more than a predefined number of times. In this case, there is then a suspicion that the SUPI code may be a clone of a valid code, identically printed on a large number of counterfeits. The checking centre then issues a reply at step 430 specifying, that the submitted code is valid, but the item is likely to be counterfeit.

The discovery of cloned codes can be refined by making use of other information, for example the origin of the query, which can be determined if the query originated from a phone, or the elapsed time between queries.

Here, 'cloning' means multiple copying of a valid production code, for example for tagging counterfeited articles. If the code has been found valid (step 440), the checking centre retrieves the significance of the code and transmits it to the user, preferably in natural language, for example: "your code corresponds to a pack of brand XYZ, intended market of retail Switzerland", or another appropriate formulation.

The information returned by the checking centre may allow the tracking of the production information for each item, for example information about the production unit, the production line, the date and time of production. Such information can be returned in encoded form, or in natural language.

Optionally the checking centre can formulate the significance of the codes into several languages, and choose the most appropriate language for the reply, according to the origin or language of the query. In a preferred embodiment, the public interface to the checking centre includes a SMS (Short Message Service) or USSD (Unstructured Supplementary Services Data) portal 60 of a public radio communication network, for example a telephone network supporting text or numeric messages like GSM, TDMA, CDMA, PDC, or UMTS standard networks, through which the users 80 can send queries to the checking centre 30 in form of text messages, or SMS, from their own cell phone 82, and receive the reply from the checking centre in the same way or by another channel, for example by a voice call. In this way the user 80 can verify an item 43 directly at the point of sale 77.

The communication may alternatively or additionally be over the internet 32 by a web server at the checking centre 30, by an email server or a WAP (Wireless Application Protocol) server.

Alternatively or additionally, the communication may be to a telephone voice server, able to interpret voice commands or DTMF (Dual-Tone Multi-Frequency) signals generated by a telephone keyboard.

Embodiments of the present invention allow a generic unidentified user to authenticate a manufactured item over a public network, such as the internet 32, a telephone network or a mobile telephone network. The user need not identify himself, nor has he to have access to any secret code or sensitive information. However, each item can be identified in a cryptographically safe way.

In a preferred embodiment, a privileged user 70, for example an employee of the manufacturer, may have a preferred access to the checking centre 30 and retrieve additional privileged information, unavailable to generic users, for example production volume information, or statistical information on the access to the checking centre. In this case, a privileged user may query information on a particular SUPI without marking it as cloned for successive queries from ordinary customers 80.

The privileged user may communicate with the checking centre 30 by a public network, or an intranet connection 33.

In a further embodiment the checking centre may provide, to generic or privileged users, additional information to which it has access, which are not contained in the UPI code, for example expiry date, warranty information, address of local support, or previous trade steps, importation routes and so forth.

Additionally the checking centre may gather and store information on production volumes, for example the number of items produced in each production batch by each production line, as well as statistical production data per brand and per intended market. Such production volume information may be used for production management, or for official purpose, and may be available to selected users.

Identification steps may be provided to identifying known privileged users, for example by passwords, cookies, voice or biometric data, or by any suitable identification means. The checker may include, or have access to, a user rights database for storing the profiles of various users, and determining to which information each user has access.

It will be appreciated that embodiments of the present invention do not require a permanent connection between the manufacturing lines and the checking centre, nor that all the SUPIs be individually stored in a database. In fact, no identification code is stored. The digital signature ensures that each item can be verified with a minimal transfer of confidential data, providing a high level of reliability and safety. Moreover production volume can be exactly accounted for. As no identification code is stored at the checking centre, the database required by the checking centre is relatively small compared to that which would be needed if the codes were stored.

In some situations, particularly if the manufactured goods are subject to special tax regulations, official government bodies may submit requests to the checking centre to obtain the appropriate production data, for example production volumes. In such cases, the checking centre 30 may be maintained by a trusted third party independent from the producer of the manufactured items 43. The embodiments described may be used to replace the system of fiscal stickers that is used in many countries to collect taxes, for example on tobacco products.

The invention claimed is:

1. A method for authenticating an item via an authentication processing device at a checking center, the method comprising:
   storing, by the authentication processing device, production batch information corresponding to the item in a database of the checking center;
   receiving, by the authentication processing device over a network, a salt file identifier from a code generator computer system;
   retrieving, by the authentication processing device, a salt file from a first computer readable medium based on the salt file identifier;
   decrypting, by the authentication processing device, a secret key for the salt file with a private key;
   sending, by the authentication processing device, the secret key to the code generator computer system;
   receiving, by the authentication processing device, a digitally signed item identifier (SUPI) of the item from a remote device over the network;
   receiving, by the authentication processing device, a random salt index alpha of the item from the code generator computer system over the network;
   deobfuscating the SUPI by the authentication processing device;
   extracting, by the authentication processing device, an item identifier (UPI) and a first noise code from the deobfuscated SUPI;
   identifying, by the authentication processing device, production batch information for the extracted UPI in the database;
   generating, by the authentication processing device, a second noise code from (i) the identified production batch information, (ii) the salt file, and (iii) the random salt index alpha;
   determining, by the authentication processing device, that the first noise code matches the second noise code;
   generating, by the authentication processing device, an authentication result by verifying that the item is authentic based on the SUPI; and
   sending, by the authentication processing device, the authentication result to the remote device over the network.

2. The method according to claim 1, further comprising:
   receiving, by the authentication processing device, a plurality of queries for the SUPI from one or more remote devices;
   counting, by the authentication processing device, a number of queries among the plurality of queries;
   comparing, by the authentication processing device, the number of queries to a threshold; and
   generating, by the authentication processing device, a notification of possible cloning in response to the number of queries exceeding the threshold.

3. The method according to claim 1, further comprising:
   tracking, by the authentication processing device, the production batch information for the item during shipping based on at least the authentication result.

4. The method according to claim 3, further comprising:
receiving, by the authentication processing device, a plurality of queries related to the SUPI from one or more remote devices; and
determining, by the authentication processing device, whether the SUPI has been cloned by counting a number of queries among the plurality of queries in relation to the SUPI and comparing the number of queries to a threshold.

5. The method according to claim 1, further comprising:
transmitting, by the authentication processing device, additional item information related to the SUPI to the remote device over the network.

6. The method according to claim 5, further comprising:
determining, by the authentication processing device, whether the SUPI has a likelihood of being cloned by counting a number of queries received in relation to the SUPI by users.

7. A non-transitory computer-readable storage medium storing computer-readable instructions that, when executed by at least one processor at an authentication processing device at a checking center, cause the at least one processor to perform a method for authenticating an item, the method comprising:
storing production batch information corresponding to the item in a database of the checking center;
receiving over a network, a salt file identifier from a code generator computer system;
retrieving a salt file from a first computer readable medium based on the salt file identifier;
decrypting a secret key for the salt file with a private key;
sending the secret key to the code generator computer system;
receiving a digitally signed item identifier (SUPI) of the item from a remote device over the network;
receiving a random salt index alpha of the item from the code generator computer system over the network;
deobfuscating the SUPI;
extracting an item identifier (UPI) and a first noise code from the deobfuscated SUPI;
identifying production batch information for the extracted UPI in the database;
generating a second noise code from (i) the identified production batch information, (ii) the salt file, and (iii) the random salt index alpha;
determining that the first noise code matches the second noise code;
generating an authentication result by verifying that the item is authentic based on the SUPI; and
sending the authentication result to the remote device over the network.

8. The non-transitory computer-readable storage medium according to claim 7, wherein the method further comprises:
receiving a plurality of queries for the SUPI from one or more remote devices;
counting a number of queries among the plurality of queries;
comparing the number of queries to a threshold; and
generating a notification of possible cloning in response to the number of queries exceeding the threshold.

9. The non-transitory computer-readable storage medium according to claim 7, wherein the method further comprises:
tracking the production batch information for the item during shipping based on at least the authentication result.

10. The non-transitory computer-readable storage medium according to claim 9, wherein the method further comprises:
receiving a plurality of queries related to the SUPI from one or more remote devices; and
determining whether the SUPI has been cloned by counting a number of queries among the plurality of queries in relation to the SUPI and comparing the number of queries to a threshold.

11. The non-transitory computer-readable storage medium according to claim 7, wherein the method further comprises:
transmitting additional item information related to the SUPI to the remote device over the network.

12. The non-transitory computer-readable storage medium according to claim 11, wherein the method further comprises:
determining whether the SUPI has a likelihood of being cloned by counting a number of queries received in relation to the SUPI by non-privileged users.

13. An authentication processing device comprising:
at least one processor;
a memory storing computer executable instructions that, when executed by the at least one processor, cause the at least one processor to perform the operations of:
storing production batch information corresponding to an item in a database of a checking center,
receiving, over a network, a salt file identifier from a code generator computer system,
retrieving a salt file from a first computer readable medium based on the salt file identifier,
decrypting a secret key for the salt file with a private key,
sending the secret key to the code generator computer system,
receiving, from a remote device over the network, a digitally signed item identifier (SUPI) of the item;
receiving a random salt index alpha of the item from the code generator computer system over the network,
deobfuscating the SUPI,
extracting an item identifier (UPI) and a first noise code from the deobfuscated SUPI,
identifying production batch information for the extracted UPI in the database,
generating a second noise code from (i) the identified production batch information, (ii) the salt file, and (iii) the random salt index alpha,
determining that the first noise code matches the second noise code,
generating an authentication result by verifying that the item is authentic based on the SUPI, and
sending the authentication result to the remote device over the network.

14. The authentication processing device according to claim 13, wherein the memory stores computer executable instructions that, when executed by the at least one processor, cause the at least one processor to perform the operations of:
receiving a plurality of queries for the SUPI from one or more remote devices;
counting a number of queries among the plurality of queries;
comparing, by the authentication processing device, the number of queries to a threshold; and
generating a notification of possible cloning in response to the number of queries exceeding the threshold.

15. The authentication processing device according to claim 13, wherein the memory stores computer executable instructions that, when executed by the at least one processor, cause the at least one processor to perform the operation of tracking the production batch information for the item during shipping based on at least the authentication result.

16. The authentication processing device according to claim 15, wherein the memory stores computer-executable instructions that, when executed by the at least one processor, cause the at least one processor to perform the operations of:
   receiving a plurality of queries related to the SUPI from one or more remote devices; and
   determining whether the SUPI has been cloned by counting a number of queries among the plurality of queries in relation to the SUPI and comparing the number of queries to a threshold.

17. The authentication processing device according to claim 13, wherein the memory stores computer executable instructions that, when executed by the at least one processor, cause the at least one processor to perform the operation of: transmitting additional item information related to the SUPI to the remote device over the network.

18. The authentication processing device according to claim 17, wherein the memory stores computer executable instructions that, when executed by the at least one processor, cause the at least one processor to perform the operation of: determining whether the SUPI has a likelihood of being cloned by counting a number of queries received in relation to the SUPI by non-privileged users.

* * * * *